W. B. WOLFF.
MEAT END PLATE.
APPLICATION FILED AUG. 9, 1915.

1,186,259.

Patented June 6, 1916.

Witnesses.
Edward T. Wray
Lenira Hirth

Inventor.
Wallace B. Wolff.
by Parker & Curtis
Attorneys.

UNITED STATES PATENT OFFICE.

WALLACE B. WOLFF, OF CHICAGO, ILLINOIS.

MEAT END PLATE.

1,186,259.　　　　Specification of Letters Patent.　　Patented June 6, 1916.

Application filed August 9, 1915. Serial No. 44,373.

*To all whom it may concern:*

Be it known that I, WALLACE B. WOLFF, a citizen of the United States, residing at Chicago, in the county of Cook and State of Illinois, have invented a certain new and useful Improvement in Meat End Plates, of which the following is a specification.

My invention relates to meat end plates for slicing machines and the like, and has for one object to provide a new and improved form of end plate for holding the meat so that it may be fed across or to the cutting knife with a minimum of waste.

Another object is to provide a face plate which will hold the meat up to the last slice.

Another object is to provide a face plate which will hold the meat up to the last slice without by any possibility interfering with or damaging the knife.

Another object is to provide such a plate which may be easily and conveniently cleaned.

Another object is to provide such a plate which may be easily adjusted and positioned with respect to any usual type of slicing machine.

Other objects will appear in the specification.

The invention is illustrated more or less diagrammatically in the accompanying drawing, wherein—

Figure 1:
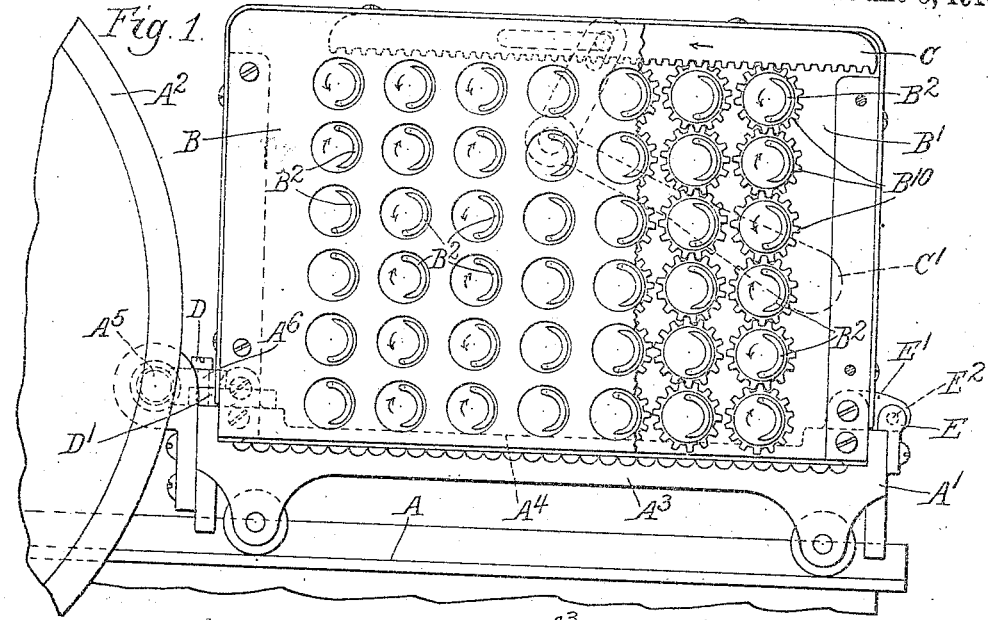
Figure 2:
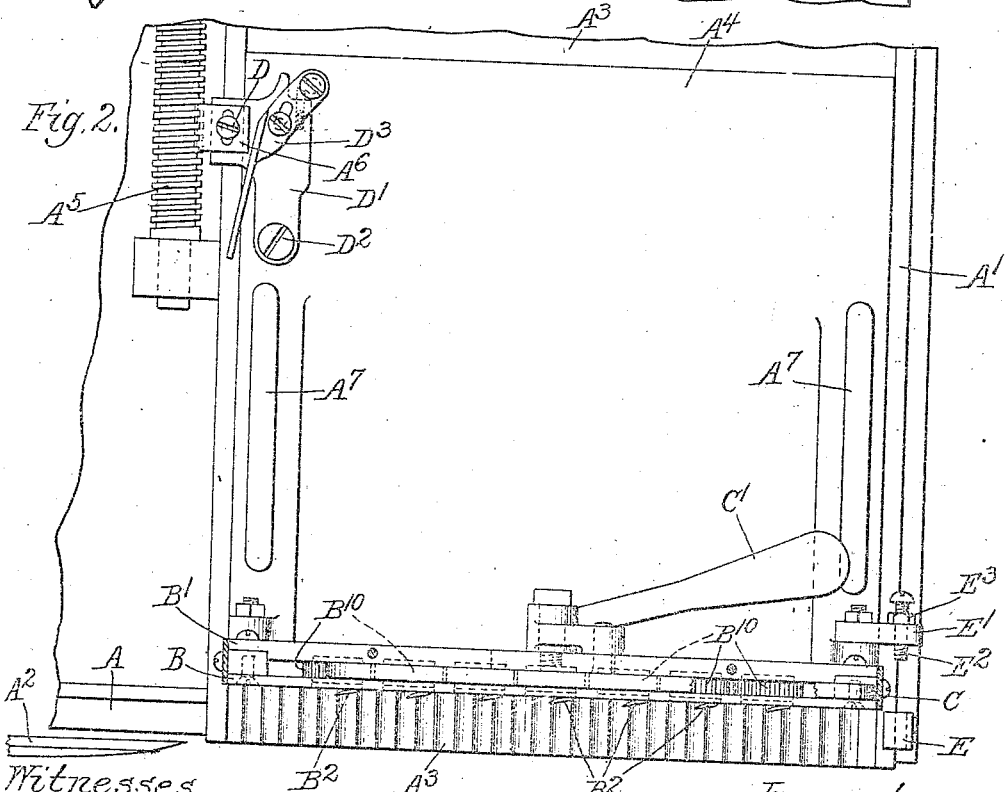

Figure 1 is a side elevation of the meat end plate, showing it in position on a slicing machine. Fig. 2 is a plan view of the end plate, showing a part of the slicing machine.

Like parts are indicated by like letters throughout the several figures.

A is a track along which the meat carriage $A^1$ is free to move being propelled by any suitable means not here shown to reciprocate it toward and from the cutting knife $A^2$. Mounted on the meat carriage is a fixed meat plate $A^3$ corrugated to guide the meat in the usual manner. Slidably mounted on the carriage above this meat plate is a feed plate $A^4$ adapted to be driven by a feed screw $A^5$ engaging a nut $A^6$ on the plate. Handles $A^7$ are provided whereby the feed plate may be manipulated.

Projecting upwardly in each case from the forward edge of the feed plate is a face plate B and it is to this face plate that the meat is attached when it is to be cut, that is to say, when the ordinary type of meat clamping plate is no longer available owing to the meat having been cut too near the heel. The face plate is apertured as indicated and behind it is located a back plate $B^1$ whose surface is recessed in register with the apertures in the face plate B. Located between the face plate B and the back plate $B^1$ and mounted for rotation are a series of gears $B^{10}$ in mesh with one another and as shown in Fig. 1 located partially within the recesses in the back plate $B^1$ and partially within apertures in the plate B. Projecting from each of these gears and extending outwardly through the apertures in the face plate are a series of spiral cork screw like hooks $B^2$, which hooks project in front of and are always located in front of the effective surface of the face plate. These gears are located in a series of separate vertical tiers, each gear in the tier being in mesh with the gears above and below it but not in mesh with the gears in any adjacent tier. Thus the adjacent gears rotate in opposite directions. The arrangement of the spiral hooks is such that when the gears are in the inoperative position before the meat is clamped, the hooks all point toward the knife, and when the meat is applied and the gear is rotated to the clamping position, the hooks all point away from the knife, so that the knife can slide freely over them without danger of catching on any hook which may by chance project out beyond the cutting edge of the knife. Arranged at the top of the meat plate B in mesh with the upper gear of each vertical tier or row of gears, is a rack C free to slide in a horizontal plane. The handle $C^1$ is provided for moving this rack back and forth to rotate the gears. This rack can move a sufficient distance to rotate each gear through an angle of approximately 180°.

It will be understood that the feed plate rests more or less freely on the guide plate, so that it may be withdrawn at the will of the operator, who lifts it off or puts it on by holding the handles $A^7$. The nut $A^6$ is held by a screw D on the lever $D^1$, which lever is pivoted as at $D^2$ on the plate adapted to be controlled by a manipulating thumb-piece $D^3$ to thrust it toward or from the screw to thrust the nut into or out of engagement with the screw $A^5$. This nut may be moved slightly with respect to the lever, in order to provide for a different arrangement or adjustment of the screw or different positions of the different parts, thus enabling the plate to be adjusted for different slicing machines.

E is a stop projecting upwardly from the part $A^1$ in opposition to a lug $E^1$ on the part $A^4$. This lug should be locked in opposition to the part E. In this lug is screw-threaded a set or stop screw $E^2$, which is provided with a lock nut $E^3$ said screw $E^2$ being adapted to positively arrest the progress of the face plate toward the knife when the predetermined limit of motion has been reached.

It will be evident that while I have shown in my drawings an operative device, still many changes might be made in size, shape and arrangement, without departing from the spirit of my invention.

The meat hooks, since they rotate in opposite directions, and since they must all engage the meat, are some of them right-handed, others left, but are all of them spiral and all of them rotatively mounted.

The use and operation of my invention are as follows:—The rack is so manipulated as to turn all the gears to bring the holding hooks into a position pointing toward the knife. The operator then brings the piece of meat into contact with the face plate, and pulls it away from the knife, holding it still in contact with the plate. This causes the holding hooks to grip the meat. The rack is then thrown back to rotate each of these hooks through an angle of 180°, causing the hooks to penetrate into the meat in a corkscrew like manner, and draw it up close upon the meat plate. It will be noted that each of these gears comes a little short of being flush with the surface of the meat plate, thus leaving a slight aperture. The corkscrew motion of the hooks, drawing as it does the meat inwardly against the plate, tends to draw the meat down into each one of these apertures. The result is that the meat is held on the plate against movement away from it in a direction at right angles to the surface thereof by the holding hooks alone, but is held against movement in a direction parallel with the surface thereof, both by the holding hooks themselves and by the fact that parts of the meat surface are drawn into the holes and thus held by the corrugated surface of the plate itself. Since the hooks always point in the same direction, it will be obvious that when the plate is to be cleaned, the brush or other cleaning member will be forced along the plate in the same direction as the hooks point. Thus there will be no interference or stop of the cleaning member. This meat plate is interchangeable and the same type of plate is designed to be used on a large number of different models of slicing machines. Some of these machines may differ in some respects from others, particularly with regard to the length and position of the feed screw. Therefore, I provide means for changing the effective position of the screw contacting nut with respect to the meat plate, and this adjustment takes the form of a slot engaged by a screw which holds the nut adjustably in position on the lever.

Furthermore, in order to limit the outward movement of the face plate and prevent its coming in actual contact with the knife, the stop is used. The operator when he undertakes to fit the face plate to his slicing machine, places the face plate on the meat plate and moves this plate as far forward as possible without bringing the hooks into actual contact with the cutting knife. He then sets up the stop screw so that it contacts the stop which is previously on the machine, and thus effectually limits the approach of the plate toward the knife. With the meat end plate and its associate parts in this position, the operator throws the lever to bring the nut into engagement with the screw, having previously loosened the screw which holds it on the lever. This permits the nut to pass into the proper thread, moving back or forward as the case may be, and the operator tightens up the screw, and the machine is ready for operation.

I claim:

1. A slicing machine comprising a rotating knife, a carriage, a means for reciprocating it toward and from the knife edge in a plane perpendicular to the axis of the knife, a meat end plate mounted on the carriage, a means for feeding it toward the plane of the knife, a series of spiral rotatable meat holding hooks projecting from the end plate toward the plane of the knife, and means for rotating all of said hooks to point toward the knife edge when in the inoperative position, and means for rotating all of them to point away from the knife edge to hold the meat.

2. A meat end plate for slicing machines and the like comprising a plane meat engaging surface, a series of meat holding hooks projecting forwardly therefrom arranged in parallel separate columns, means for rotating all of said hooks in unison, and adjacent hooks in opposite directions to engage and draw the meat against the plane surface, the hooks being arranged to all point in the same direction when in the inoperative position and when engaging the meat.

3. A meat end plate for slicing machine and the like, comprising a meat holding surface, a series of spiral rotatably mounted meat hooks projecting forwardly therefrom, a means for rotating said hooks through a fixed angular distance to engage and clamp the meat upon the plate, means for limiting the movement of such hooks to bring all the hooks to rest in the meat clamping position their points pointed in the same direction, said hooks being free to move only in a direction parallel to the plane of the plate.

4. A meat end plate for slicing machines and the like, comprising a meat holding surface, a series of gears arranged on one side thereof, spiral meat holding pins carried thereby and projecting through onto the other side of the plate, said gears being arranged in parallel columns, each gear being in mesh with the gear on either side of it, and means for driving one gear in each column to rotate the other gears in such column.

5. A meat end plate for slicing machines and the like, comprising a meat holding surface, a series of gears arranged on one side thereof, spiral meat holding pins carried thereby and projecting through onto the other side of the plate, said gears being arranged in parallel columns, each gear being in mesh with the gear on either side of it, and means for driving one gear in each column to rotate the other gears in such column, the meat hooks on alternate gears being respectively right-handed and left-handed.

6. A meat end plate for slicing machines and the like, comprising a meat holding surface, a series of gears arranged on one side thereof, spiral meat holding pins carried thereby and projecting through onto the other side of the plate, said gears being arranged in parallel columns, each gear being in mesh with the gear on either side of it, and means for driving one gear in each column to rotate the other gears in such column, the driving means comprising a rack in mesh with one gear in each column and means for reciprocating said rack.

7. A meat end plate for slicing machines and the like, comprising a meat holding surface, a series of gears arranged on one side thereof, spiral meat holding pins carried thereby and projecting through onto the other side of the plate, said gears being arranged in parallel columns, each gear being in mesh with the gear on either side of it, and means for driving one gear in each column to rotate the other gears in such column, the meat hooks on alternate gears being respectively right-handed and left-handed, the driving means comprising a rack in mesh with one gear in each column and means for reciprocating said rack.

8. The combination with a slicing machine comprising a cutting knife, a carriage and means for reciprocating it toward and from the knife in a plane parallel to the plane of the knife, a meat plate carried by the carriage and means for feeding it along the carriage in a direction perpendicular to the plane of the knife, a series of spiral meat holding hooks rotatably mounted on and projecting from the end plate and means for rotating them to bring them into engagement with the meat with their points pointing away from the cutting knife when the carriage is at the commencement of its travel toward the knife.

9. A meat holder for slicing machines and the like comprising a face plate, a series of cork screw like meat holding hooks projecting forwardly therefrom and held against movement along a line perpendicular to the surface of the plate, the adjacent hooks being spiraled in opposite directions and means for rotating all of said hooks in unison and adjacent hooks in opposite directions, the excursion of said rotating means being limited so that the hooks when in the operative meat engaging position all point in the same direction, a knife and means for feeding said plate toward the edge thereof in a direction opposite to the direction in which the hooks point.

In testimony whereof, I affix my signature in the presence of two witnesses this 5th day of August, 1915.

WALLACE B. WOLFF.

Witnesses:
 GENEVA HIRTH,
 ELLA THIEME.